UNITED STATES PATENT OFFICE.

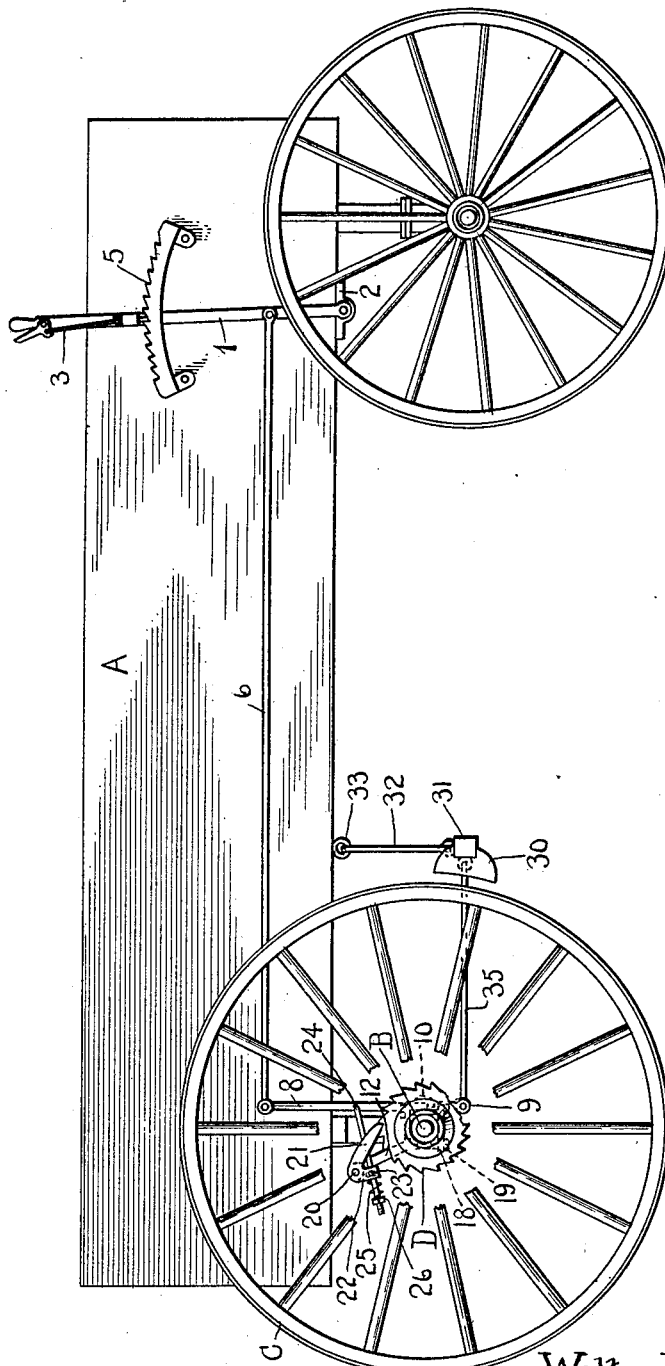

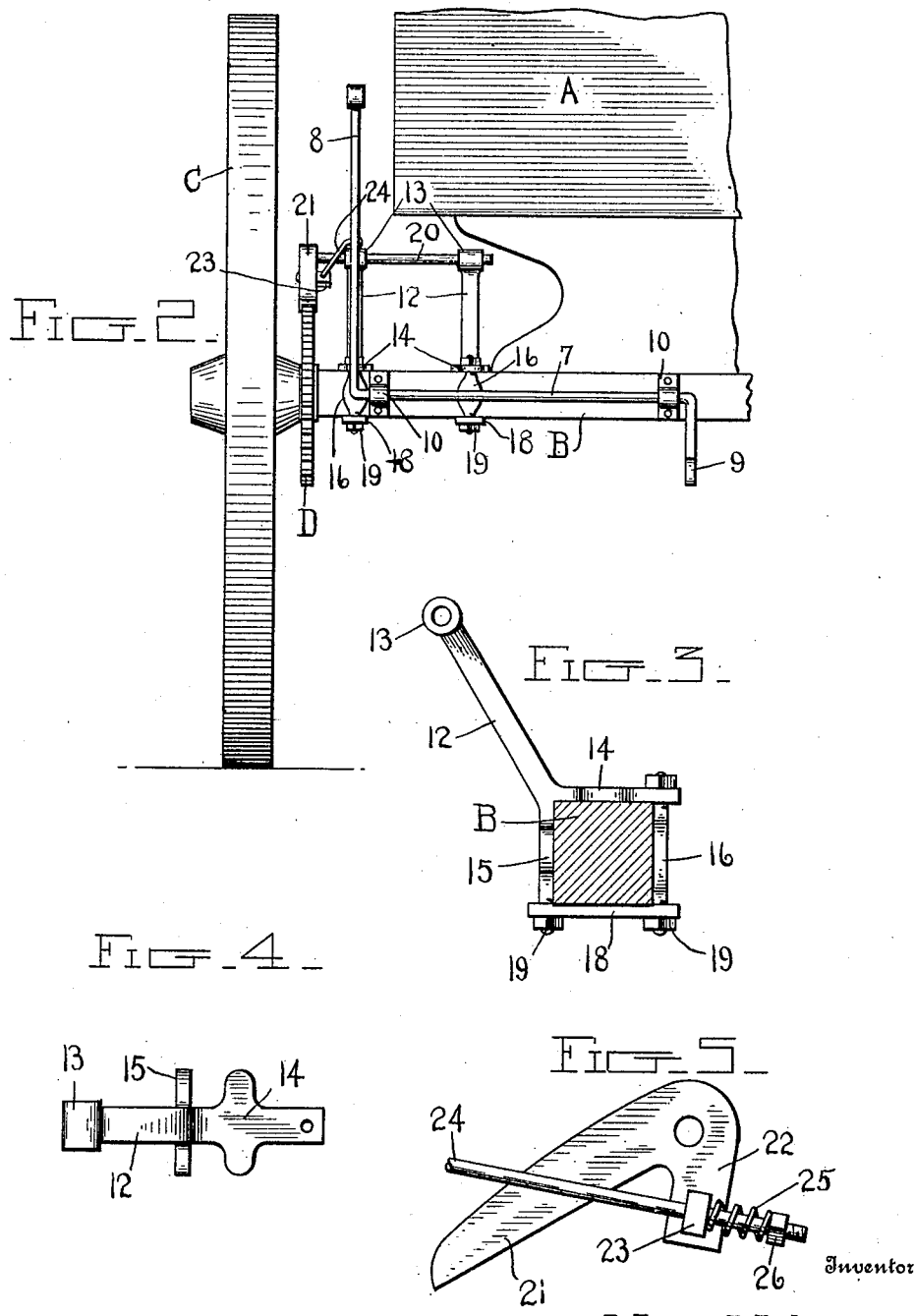

WALTER W. JONES, OF CHESTER, WASHINGTON.

WHEEL-LOCK.

No. 910,068.     Specification of Letters Patent.     Patented Jan. 19, 1909.

Application filed February 14, 1908. Serial No. 415,939.

*To all whom it may concern:*

Be it known that I, WALTER W. JONES, a citizen of the United States, residing at Chester, in the county of Spokane, State of Washington, have invented certain new and useful Improvements in Wheel-Locks; and I do hereby declare the following to be a full, clear, and exact description of the invention, such as will enable others skilled in the art to which it appertains to make and use the same.

This invention has relation to a new and useful improvement in wagons and comprises a wheel lock.

The object of my invention is to provide that class of vehicles known as work-vehicles embodying farm wagons, drays and other vehicles adapted to carry heavy loads, with a wheel locking device so arranged that the vehicle may be carried forward but is checked against any backward or retrograde movement as will be described more fully hereinafter.

In the accompanying drawings I have shown in Figure 1 a side elevation with portions removed of a farm wagon provided with my wheel locking mechanism. Fig. 2 shows an elevation with portions removed. Fig. 3 shows a side view of one of the brackets supporting the pawl shaft. Fig. 4 shows a top view of one of these brackets, while Fig. 5 shows an enlarged detached detail of the pawl as used in my invention.

In the accompanying drawings I have shown at A the body of an ordinary farm wagon provided with the brake lever 1 held by the supporting ear 2, this lever being provided with the usual pawl locking mechanism 3, working in connection with an ordinary segmental rack 5 as is usual in vehicle construction.

Secured to the rear axle B by means of the supporting ears 10 is an ordinary crank shaft 7, to the upper lever member 8 of which is secured a connecting rod 6 which at its forward end is secured to the brake lever 1 as disclosed in Fig. 1.

Secured to the axle B are two supporting brackets 12 within the upper bearing eyes 13 of which is held the rock shaft 20. These brackets are provided with the projecting members 14 and 15, the member 14 being adapted to ride upon the top of the axle and the member 15 against the rear of the axle, as disclosed in Fig. 3, where the rear axle is shown in section. These projecting members assist in securing the bracket, a bolt 16 being extended through a perforation within the member 14 while the member 15 is threaded below to receive in conjunction with the bolt 16 a clip 18 secured by means of the nuts 19.

Secured to the hub of one of the rear wheels C is a ratchet collar D. Secured to the outer end of the rock shaft 20 is a pawl 21 which pawl is adapted to work upon the ratchet D as shown in Figs. 1 and 2. This pawl 21 is provided with a recurved arm 22 having an ear 23 and extending through this ear 23 is a connecting rod 24 which at its forward end is secured to the lever 8. The end of this connecting rod 24 adjacent the ear 23 is threaded to receive the terminal adjusting nut 26 and interposed between this terminal nut and the ear 23 is the spring 25 as clearly disclosed in Fig. 5.

In Fig. 1, I have shown the farm wagon A as provided with the eye-bolt 33 from which is held pendent the hanger 32 supporting the shoe beam 31 to which beam is secured at each end a brake shoe 30.

In Fig. 1 the instrumentalities are so arranged that the wagon may be readily carried forward but is prevented from any backward movement because of the engagement of the pawl 21 with the ratchet D. As the ratchet D revolves the pawl 21 readily slides over the rack teeth. Now if the operator should desire to back the wagon he would simply slightly throw the operating lever 1 forward which results in the connecting rod 24 carrying the pawl out of engagement before the brake shoe is brought into engagement with the wheel C. By means of the set-nut 26 and the interposed spring 25 a nice adjustment of the pawl will be obtained. The crank shaft 7 is provided with the crank 9, and from this crank extends the connecting bar 35, secured to the brake beam 31, as disclosed in Fig. 1. By this arrangement the lever 8 first carries out of engagement the pawl 21, and then by means of the connecting rod 35, actuates the brake beam 31, and

Having thus described my said invention what I claim is—

1. The combination with a brake provided vehicle of the following instrumentalities, to wit: a ratchet secured to one of the hubs of a rear wheel of said vehicle, supporting brackets secured to the axle of said vehicle, a rock shaft held by said brackets, a pawl carried by said rock-shaft provided with an arm, an ear secured to said arm, a connecting rod adjustably secured to said arm, and means to secure said rod to the brake mechanism of said wagon.

2. A vehicle having in combination, a ratchet wheel secured to one of the rear hubs, a bracket secured to said vehicle, a rock shaft carried by said bracket, a pawl secured to said rock shaft in engagement with said ratchet wheel, an operating rod, and means to yieldingly secure said pawl to said operating rod.

In testimony whereof, I affix my signature, in presence of two witnesses.

WALTER W. JONES.

Witnesses:
GEORGE D. BOLLER,
HENRY E. JONES.